United States Patent
Westergaard (10) Patent No.: US 9,410,528 B2
(45) Date of Patent: Aug. 9, 2016

(54) METHOD FOR ASSEMBLING AND TRANSPORTING AN OFFSHORE WIND TURBINE

(71) Applicant: Envision Energy (Denmark) ApS, Silkeborg (DK)

(72) Inventor: Jan Westergaard, Brande (DK)

(73) Assignee: Envision Energy (Denmark) ApS, Silkeborg (DK)

(*) Notice: Subject to any disclaimer, the term of this patent is extended or adjusted under 35 U.S.C. 154(b) by 162 days.

(21) Appl. No.: 14/260,360

(22) Filed: Apr. 24, 2014

(65) Prior Publication Data

US 2014/0317927 A1    Oct. 30, 2014

(30) Foreign Application Priority Data

Apr. 24, 2013  (DK) ............................... 2013 70227

(51) Int. Cl.
| | | |
|---|---|---|
| B60P 3/40 | (2006.01) | |
| F03D 1/00 | (2006.01) | |
| B63B 35/00 | (2006.01) | |

(52) U.S. Cl.
CPC ............... *F03D 1/001* (2013.01); *F03D 1/005* (2013.01); *B63B 35/003* (2013.01); *F05B 2230/61* (2013.01); *Y02E 10/721* (2013.01); *Y02E 10/728* (2013.01); *Y02P 70/523* (2015.11); *Y10T 29/49321* (2015.01)

(58) Field of Classification Search
CPC ............ Y02E 10/727; Y10T 29/49321; Y10T 29/49904
See application file for complete search history.

(56) References Cited

U.S. PATENT DOCUMENTS

| | | | | |
|---|---|---|---|---|
| 5,226,805 A | * | 7/1993 | Proven | F03D 7/0224 416/132 A |
| 7,805,893 B2 | * | 10/2010 | Scholte-Wassink | F03D 1/001 290/55 |
| 8,528,735 B2 | | 9/2013 | Nies | |
| 8,640,340 B2 | * | 2/2014 | Foo | B63B 35/003 114/259 |
| 2009/0317250 A1 | * | 12/2009 | Gamble | F03D 1/0658 416/1 |
| 2010/0293781 A1 | * | 11/2010 | Foo | B63B 35/003 29/791 |
| 2011/0220538 A1 | | 9/2011 | Nies | |

FOREIGN PATENT DOCUMENTS

| | | |
|---|---|---|
| EP | 2 463 511 A1 | 6/2012 |
| JP | 2004-353644 A | 12/2004 |
| JP | 2012-122481 A | 6/2012 |

* cited by examiner

*Primary Examiner* — Jason L Vaughan
*Assistant Examiner* — Amanda Meneghini
(74) *Attorney, Agent, or Firm* — David S. Safran (57) ABSTRACT

A method for assembly and installation of an offshore wind turbine, where components such as a nacelle, one or more tower sections and/or blades for at least one wind turbine is manufactured, assembled at or transported to a harbor area, where said components are loaded onto a transport and installation vessel and subsequently transported to an erection site. The method involves at least the steps of assembling at least one nacelle for a two-bladed wind turbine having hub with two sets of blade installation interfaces facing in a radial direction, the blade installation interfaces having a 180 degree angular distance therebetween, installing at least one, but preferably two inner blade parts to the hub, and arranging the at least one nacelle with the at least one inner blade part attached to the hub on the deck of a transport and installation vessel.

16 Claims, 8 Drawing Sheets

METHOD FOR ASSEMBLING AND TRANSPORTING AN OFFSHORE WIND TURBINE

BACKGROUND OF THE INVENTION

1. Field of the Invention

The present invention relates to a method for assembly and installation of an offshore wind turbine, where components such as a nacelle comprising a shaft and a hub, one or more tower sections and/or blades are manufactured, assembled at or transported to a harbor area, where said components for one or more wind turbines are loaded onto a transport and installation vessel and subsequently transported to an erection site.

2. Description of Related Art

It is well known that transporting a wind turbine in the megawatt class can be a challenge due to the weight and size of at least some of the components of such a wind turbine. Typically, a wind turbine is transported in a number of pieces to an erection site and then assembled at the site. Such pieces will typically be a number of tower sections, a nacelle including a hub, and then the blades. The parts will be installed piece by piece at the erection site using cranes that fulfil the specific demands.

As the wind turbines becomes larger and larger in capacity so does the tower sections, the nacelles, the blades and other parts of the wind turbine. A typically nacelle can easily have a weight of more than 200 metric tons and can easily have a diameter or height of up to eight meters or more. Hoisting such a nacelle to its final position on top of a 100 meter high tower demands optimum conditions. The same goes for installation of the wind turbine blades that these days can have a length of up to 75 meters and in the near future even longer.

No matter if installation of the blades is performed by hoisting the blades to the nacelle on top of the tower, or if the blades are installed at the nacelle before hoisting the complete unit to the top of the tower the wind speed needs to be taken into consideration.

Hoisting of such components needs to be performed very accurately in order to be able to bolt the parts together without damaging the interfaces on said parts and one very important factor when it comes to installing wind turbines is actually the wind. It lays in the nature of an erection site for a wind turbine that it is a windy area which, of course, is perfect after installation, but which very often causes problems during installation.

During installation of wind turbines, it is thus very common having to pause the work for hours, days, or even weeks until the wind situation is suitable and steady for the jobs to be carried out. Onshore, this is of course annoying and causing extra costs, but this is actually nothing compared to the costs caused when an offshore installation has to be put on hold until the wind has a suitably low speed and perhaps also until the impact of the waves is minimized. Having all of the needed equipment in position for erecting an offshore wind turbine, but having to wait for better conditions is a major expensive problem. It is thus very attractive to assemble as much of a wind turbine onshore, at a factory or at the harbor area, prior to transporting the partly assembled wind turbine to an erection site. In turn, transporting partly assembled wind turbine components offshore will induce further challenges, mainly due to the influence that high and heavy components can have on the stability of the vessel used, as the center of gravity will be located relatively high in relation to the water surface.

Further, there is still a need for hoisting the components into place and these hoists still need conditions that are more or less the opposite of what is common for the site—namely low or no wind!

From U.S. Patent Application Publication 2011/0220538 A1 and corresponding U.S. Pat. No. 8,528,735 B2, a solution for transporting a nacelle comprising a rotor hub having three wind turbine blades is known. Additional parts of the wind turbine, such as tower sections, need to be installed separately from another vessel. Here, the nacelle and the rotor are installed in a special transport frame, which allows the nacelle to be shifted from a first position where the main shaft is more or less horizontal to a second position where the main shaft is in a less than vertical position. After having arranged the nacelle in this position, the rotor, comprising three wind turbine blades, is installed. As the main shaft is in a less than vertical position, it is possible to position more nacelles on the deck of a transport vessel having the rotors overlapping each other. A rather large disadvantage of using this method is that the complete nacelle comprising the rotor hub and the wind turbine blades needs to be hoisted from the transport vessel as a single unit, after which the transport frame has to be removed either before swinging the complete arrangement approximately 90° to a height well above the deck of the transport vessel or well above the water surface. Such an operation is very demanding and requires very good weather conditions, which evidently will incur large costs.

European Patent Application EP 2 463 511 A1 discloses a solution for transporting rotors comprising mainly two out of three wind turbine blades. The rotors are not installed at a nacelle and are arranged at the deck of a vessel with a inclined center axis of the hub. As a result, it becomes possible to have the rotors overlapping each other, and thus, to carry more rotors on one vessel. Also, in this solution, the rotor needs to be hoisted a certain distance above the deck of the vessel and then to be swung approximately 90 degrees in order to arrange the rotor in a position where it can be installed at a nacelle. Such an installation needs to take place at a nacelle that already is installed on a tower, meaning that the installation takes place approximately 80 to 120 meters, or even more, above sea level, making the operation much more sensitive to, e.g., wind.

Until now, no known solutions address the above mentioned problems of partly assembling and transporting a modern two-bladed megawatt wind turbine to an erection sites on a vessel where the partly assembled parts are loaded onto the deck of said vessel without having a significantly high center of gravity.

SUMMARY OF THE INVENTION

It is a primary object of the invention to provide a method for assembling and for transportation of offshore two-bladed wind turbines, where a considerable part of the assembly of the wind turbine is carried out before loading the components onto an offshore vessel.

It is a further object of the invention to provide a method for arranging at least pre-assembled nacelles comprising one or two inner blade parts.

As mentioned above, the invention relates to a method for assembly and installation of an offshore wind turbine, where components, such as a nacelle comprising a shaft and a hub, one or more tower sections and/or blades, are manufactured, assembled at or transported to a harbor area, where the components for one or more wind turbines are loaded onto a transport and installation vessel and subsequently transported to an erection site.

According to the invention, the new method for assembly and installation of an offshore wind turbine comprises at least the steps of:

assembling a nacelle for a two-bladed wind turbine, where the hub at said nacelle comprises two sets of blade installation interfaces facing in a radial direction, said blade installation interfaces being separated by a 180 degree angular distance, installing at least one, but preferably two inner blade parts at said hub, arranging said nacelle comprising the hub and at least one inner blade part directly or indirectly at the deck of said transport and installation vessel.

By installing dividable blades—at least an inner blade part, also called a blade extender—at a blade installation interfaces at a hub of a nacelle prior to loading the nacelle onto the vessel provides for several advantages. First of all, the installation process can be carried out before loading the nacelle, hub and the at least one inner blade part onto an installation vessel. As a result, the installation process is independent of the waves at sea, and also is considerable less dependent on the wind, as the wind typical is lower on shore. Alternatively, it is possible to shield the installation area from the wind. As the wind turbine is a two-bladed wind turbine, the center of gravity of a nacelle comprising one or two inner blade parts will still be at approximately the same level as if the parts were loaded individually at the deck of the vessel. This allows for a steady transport compared to some of the known offshore transport and installation methods used until now.

As mentioned, this method relates to installation and transport of offshore wind turbines having two blades. Such blades can be pitch controlled or stall controlled dividable blades having an interface somewhere along the length, where the inner blade part is connected with the outer blade part. Such an interface can be any suitable type of interface and the blades can be any type of wind turbine blade. However, the blades can be of the partial pitch blade type, which comprise an inner blade part fixed to the hub and an outer blade part fixed to a pitch mechanism between the inner blade part and the outer blade part. Such inner blade parts typically constitute ⅓ of the full blade length, meaning that a nacelle comprising a hub and two inner blade parts will be possible to handle and to transport as a single unit.

No matter which type of blade (stall or pitch controlled) is to be installed at the hub, there is a very significant advantage in installing dividable blades as compared to "ordinary" unitary full length blades. The most important factor is that the inner blade parts of the dividable blades can be installed at the harbor area without being too wide. Very often there is not room enough at the pier to handle a nacelle with already installed blades when the blades are full length. According to the invention the blades are dividable and thus shorter than a full length blade. The shorter length means that installation at the harbor area, e.g., at the pier, is possible and it is also possible to load and transport a nacelle with one or two inner blade parts to the erection site on a vessel with a considerable reduced width/size as compared to a vessel being able to load a nacelle with two full length blades.

In an embodiment of a method for assembly and installation of an offshore wind turbine according to the invention, the method further comprises the steps of:

transporting said nacelle comprising at least one inner blade part to an erection site, installing further blades or blade parts to said hub, hoisting and installing said nacelle to a position on a tower for a wind turbine.

During transport and before installing the nacelle at a tower, the outer blade part will be attached to the inner blade part. This can be done as soon as the installation vessel is at a location that allows for the outer blade part to be installed without the load being too wide. Typically, the further blade parts will be installed when the transport and installation vessel arrives at the erection site or at sea just before arriving at the erection site. After installing the inner and outer blade parts to the nacelle, the complete and fully assembled nacelle comprising the rotor with two blades can be hoisted to the top of the tower and can be positioned and installed in a single operation. By being able to install the complete nacelle with blades in one operation, a quick and simple and also less expensive installation is achieved.

Further, it is also cost reducing to install only the outer blade part—a short blade—at sea as the size of the parts to be handled at the erection site is very important. Smaller parts— as is the case for an outer blade part—can be handled in higher wind conditions than larger blades due to the fact that they can more easily be handled as the impact from the wind is less. This provides much safer handling and a larger time window to operate within regard to wind speed and wave impact. If the wind and/or waves are too high, the installation operations need to be stopped and postponed until better conditions are established. As the equipment used, i.e., the vessel, is very expensive it is very important to optimize the installation process and to be able to work instead of waiting for better conditions. Only having to handle the shorter outer blade parts at the erection site will minimize the problems and make it possible to finish the installation in a shorter time, and at the same time, reduces risks and costs.

By installing some parts at the harbor area, at the pier, and the rest of the parts before hoisting the nacelle, including the blades, to the top of the tower, the installation process is optimized.

In a preferred embodiment of a method for assembling and installation of an offshore wind turbine according to the invention, the nacelle is assembled at a temporary assembly facility at the harbor area or alternatively near the harbor area. This can be taken care of in a so called "gypsy manufacturing facility" (i.e., a facility that is established for only a relatively short period of time). Such a gypsy facility is established and the various parts can then be provided to and assembled at or near the harbor area. One very big advantage with this is that the large, heavy items can be transported in smaller pieces allowing standard trucks, railroad cars or other traditional transport means to be used instead of using special heavy and long transport units.

A method for assembling and installation of an offshore wind turbine according to the invention can comprise that said blades are manufactured or assembled at a temporary assembly facility/gypsy manufacturing facility, at the harbor area or alternatively near the harbor area. Also producing and/or assembling the blades at or near the harbor area eliminates major transport issues as modern blades very often can have a length of up to 75 meters. When speaking about two part blades of the partial pitch type, the inner blade part is often approximately ⅓ and the outer blade part is approximately ⅔ of the blade length. Although this "only" will give a maximum length of approximately 50 meters, it is still quite beneficial to produce and assemble at a location near the harbor area where the parts will be shipped from.

A method for assembling and installation of an offshore wind turbine according to the invention further comprises the steps of:

arranging a tower section at the harbor area, installing at least one container, e.g., two containers, at the side of the tower section, the containers comprising equipment for controlling the wind turbine, for converting and transforming the power generated by the wind turbine and/or for connecting the wind turbine to the overall electrical grid, arranging the tower section, having at least one container installed at the side, directly or indirectly at the deck of the transport and installation vessel.

Also, installation of containers at the side of a tower section is a job that has to take place during low or no wind conditions. The containers contain rather sensitive electrical and electronic equipment and need to be handled carefully. Thus, it is very advantageous to be able to install the containers during more stable wind conditions before loading the tower section comprising the pre-installed container or containers. One further advantage of installing such containers at the harbor area is that the containers do not need to be hoisted as high as when installing at sea. In the harbor area, the installation takes place with the tower at ground level, but when installing the containers at sea, the tower will be installed at a foundation and on top of a transition piece leaving the interface on the tower for the container at a higher level as compared to installation on shore. Further, any installation at sea is complicated by the fact that it is an offshore operation.

A method for assembling and installation of an offshore wind turbine according to the invention also comprises that the vessel comprises jack-up means for lifting the vessel at least partly out of the sea. This is one way of dealing with the influence of the waves and to minimize the operational length of the crane as the hull of the installation and transport vessel is jacked up until it is free of the water, and thus, not under influence of the waves. Still the wind will act on the parts as they are hoisted, but according to the invention the parts are pre-assembled and it is only necessary to perform a minimum number of hoists.

A method for assembling and installation of an offshore wind turbine according to the invention may also comprise that said vessel has fixation means for mechanical fixation to a wind turbine foundation or to a transition piece installed at a foundation. Such fixation means can comprise arms or other suitable equipment that can be connected to, e.g., the foundation in order to position the vessel in a steady position at the foundation. This is an alternative solution to using a jack-up vessel which primarily is suitable at very large depths where the legs of a jack-up vessel cannot reach the bottom of the sea or if the bottom is too unstable to support the vessel and its cargo.

In a method for assembling and installation of an offshore wind turbine according to the invention, said nacelles comprising the installed blades or blade parts are arranged at the deck of said vessel with the blades or blade parts pointed in a transverse direction in relation to the length of the vessel. By arranging the units—a nacelle comprising one or two inner blade parts—transverse to the length of the vessel, the units may be wider than the width of the vessel as the end or ends of the inner blade parts can extend from the side or sides of the vessel. The heavy part of the unit, namely the nacelle will preferably be positioned at or near the center of the longitudinal axis of the deck of the vessel. This way a more stable load is achieved.

In another method for assembling and installation of an offshore wind turbine according to the invention, the nacelles comprising the installed blades or blade parts are arranged on the deck of the vessel with the blades or blade parts pointed in a longitudinal direction in relation to the length of the vessel. In this way, the configuration of the deck can be used in an optimum manner as the units can be arranged close to each other, and still obtain a good distribution of the weight of the various parts. Arranging the units with the inner blade parts in the lengthwise direction of the vessel and still having room on the deck for tower sections and other parts is possible as at least the outer blade parts, which are somewhat fragile, are not mounted. The outer blade parts will preferably be arranged in suitable frames at another place on the deck, and installed only prior to hoisting the nacelle to its position at the tower. It is thus possible to arrange the units between the jack-up legs which otherwise not would be possible.

An embodiment of the invention comprises a method for assembling and installation of an offshore wind turbine, comprising the steps of:

loading at least one set of nacelles, comprising a hub and at least one inner blade part each, loading at least one set of blades, inner blade parts and/or outer blade parts, loading tower sections for at least one tower, transporting at least one set of partly assembled wind turbines on the same vessel at the same time.

By arranging the various parts as described above, it becomes possible to optimize the use of deck area in order to transport as many wind turbines as possible at the time. As the vessels used for transport and for installation are very expensive to use, this is very important. According to the invention, it is possible to transport an optimized number of wind turbines and also—which is very important—to perform a faster installation as the number of hoists that has to be carried out are minimized.

A faster installation has several advantages, but the most important ones are that it is cheaper and less dangerous to handle smaller parts than larger parts. A further advantage is that the installation of a wind turbine can be finished in a shorter time, and thus, the wind turbine can start producing power sooner.

An embodiment of the invention will now be described, by way of example only, with reference to the accompanying drawings.

DETAILED DESCRIPTION OF THE INVENTION

In the following text, the figures will be described one by one and the different parts and positions seen in the figures will be numbered with the same numbers in the different figures. Not all parts and positions indicated in a specific figure will necessarily be discussed together with that figure.

Figure 1:
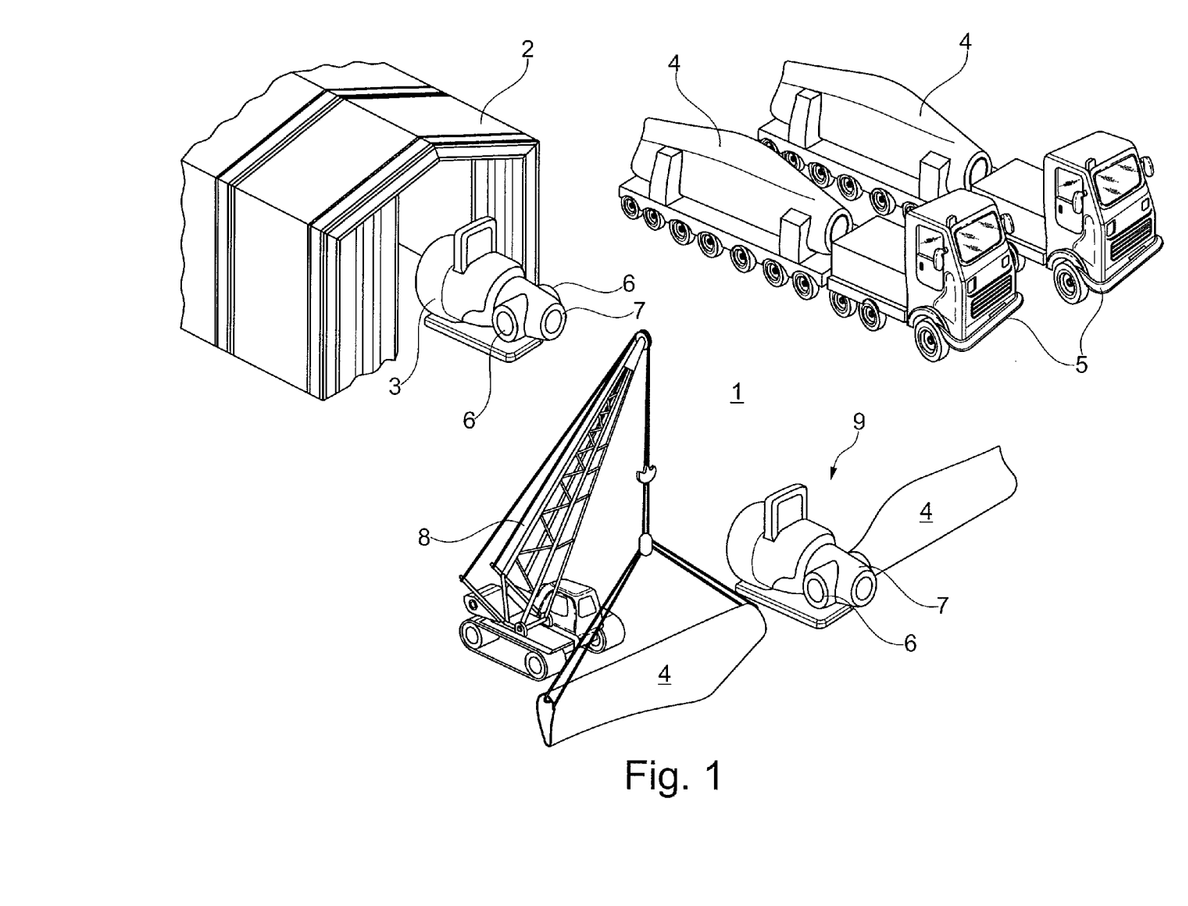
FIG. 1 shows an assembly situation for a nacelle comprising inner blade parts.

In FIG. 1, a harbor area 1 is seen comprising an assembly facility 2 for assembly of nacelles 3. After assembly of a nacelle 3, inner blade parts 4 brought to the harbor area 1 by transport vehicles 5 are installed at the blade installation interfaces 6 of the hub 7 of the nacelle 3. This installation is carried out using a crane 8. The installation takes place at the harbor area 1 before loading the unit 9 comprising a nacelle 3, and in this case, two inner blade parts 4 onto a transport and installation vessel 10 (see, FIGS. 3, 4, 5 and 6). Thus, the installation is done in a friendlier environment as compared to doing the same at an offshore location.

One main advantage of assembling and installing at the harbor area 1, is that the parts 3, 4, 7 can be transported in pieces using ordinary transport vehicles 5 and can be hoisted using ordinary cranes 8 and other hoisting equipment.

Figure 2:
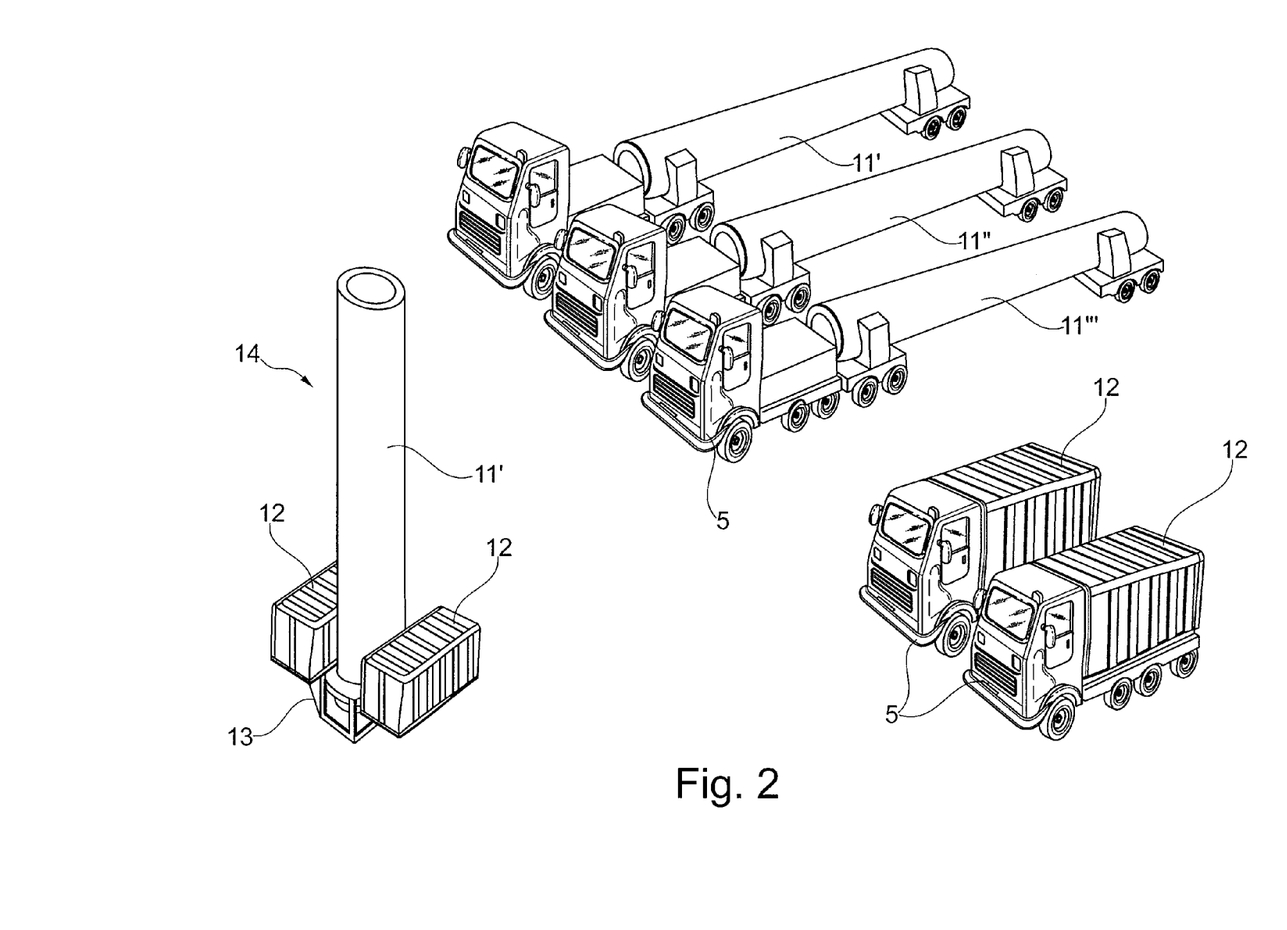
FIG. 2 shows an assembly situation for a lower tower section comprising containers.

In FIG. 2, the tower 11 comprising three tower sections 11', 11", 11' is being transported to the harbor area 1 using transport vehicles 5. Further, the containers 12 are also transported to the harbor area 1, by transport vehicles 5. Before loading the tower sections 11 onto the vessel 10 (see, FIGS. 3, 4, 5 and 6), the containers 12 are installed at a framework 13 on the lower tower section 11' so as to constitute a tower unit 14. The same benefits from the friendlier environment mentioned above apply for assembly of the tower unit 14.

Figure 3:
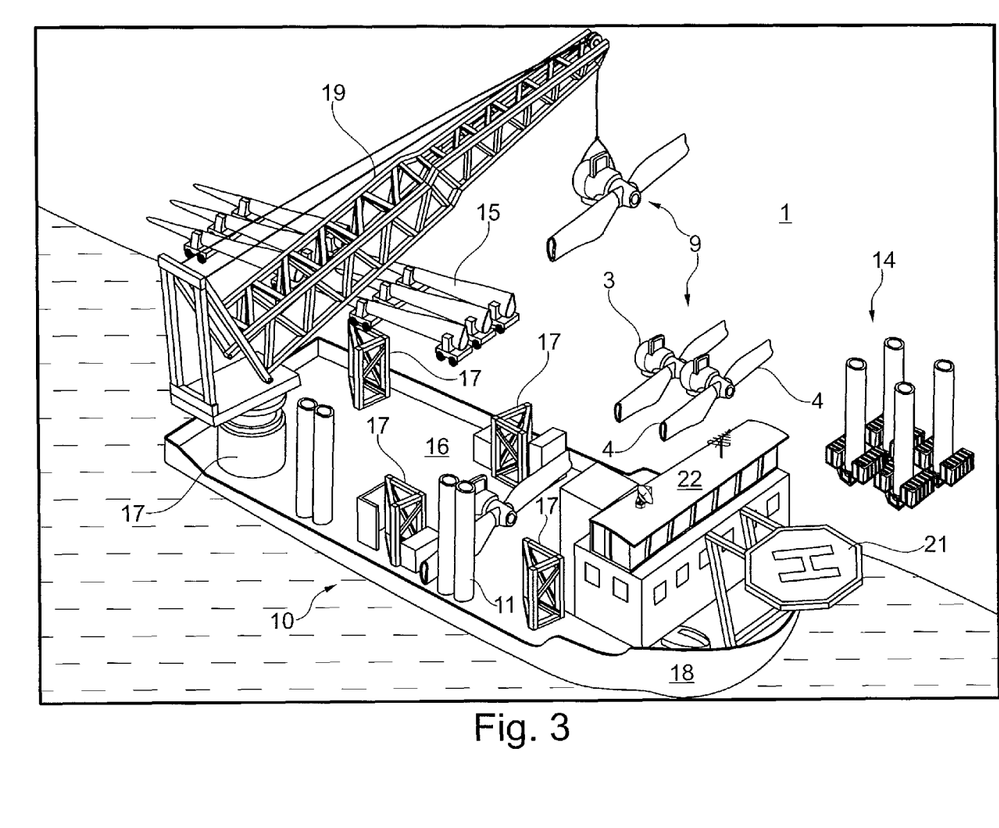
FIG. 3 shows loading of assembled nacelles, tower sections and outer blade parts onto an installation vessel.

FIG. 3 shows that, after having prepared the pre-assembled units 9, 14, the respective units 9, 14, the tower sections 11", 11" and the outer blade parts 15 are hoisted onto the vessel 10 and placed either directly on the deck 16 or in a suitable fixture (not shown). Such a fixture could, for instance, be a frame for holding the outer blade parts 15 in several layers on top of each other. Tower sections 11', 11", 11" are transported in an upright position and the nacelle units 9 are arranged with the inner blade parts 4 pointed in a transverse direction when seen in relation to the length of the vessel 10. In this configuration, the heaviest parts—the nacelles 3—are centrally positioned on the deck 16, amidships, giving the best trim of the vessel 10.

The vessel 10 comprises six jack-up legs 17 that can be lowered and brought into contact with the bottom of the sea in order to lift the hull 18 of the vessel 10 out of the water during installation at the erection site. The vessel further comprises an on board crane 19 that has the capability of handling the various parts of the wind turbines. The nature and manner of use of the jack-up legs 17 to lift the hull 18 of the vessel 10 out of the water is known in the art, and thus, need not be described in detail.

Figure 4:
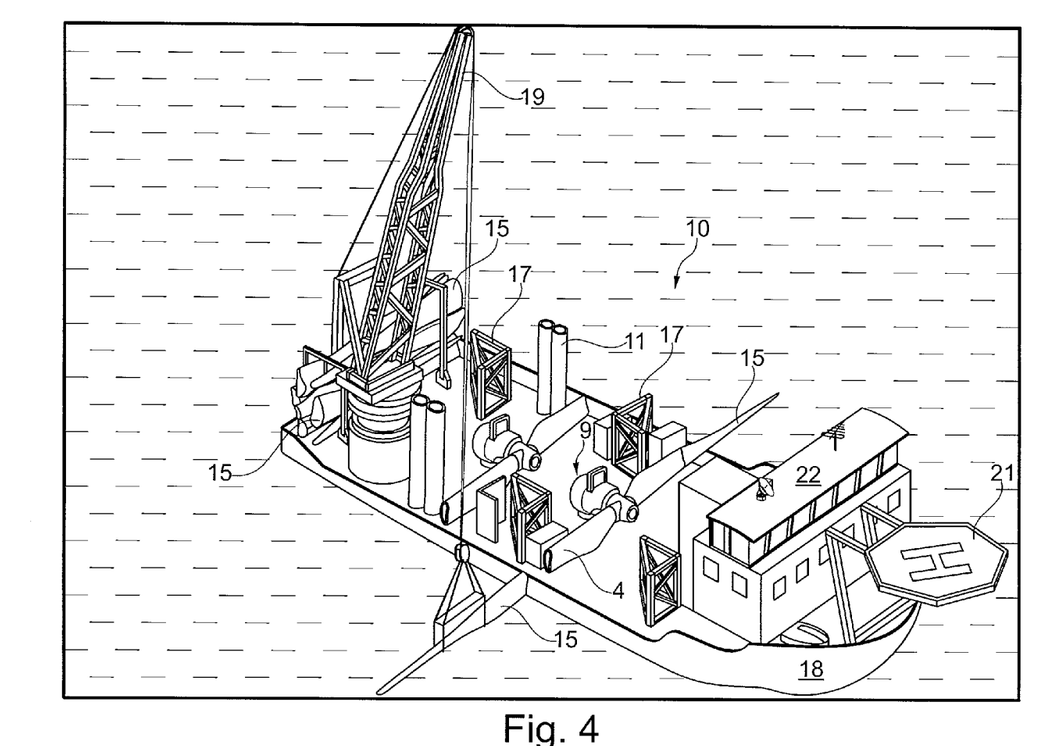
FIG. 4 shows installation of the outer blade sections at sea.

In FIG. 4, the outer blade parts 15 are shown being installed at the inner blade parts 4 using the onboard crane 19. This operation is carried out at sea, where there is sufficient room for handling the parts. The operation seen in FIG. 4 can be performed either before jacking up the vessel 10 or after the vessel 10 is jacked up at the erection site, depending on what is the most efficient method. It is possible to install the outer blade parts 15 on the inner blade parts 4 prior to or after installing the tower unit 14 and the further tower sections 11 on the foundation at the erection site. The sequence is free to be chosen according to the specific situation. If, for example, there is too much wind for erecting the tower the time can be spent installing the outer blade parts 15, as this operation is less sensitive to the wind speed.

Figure 5:
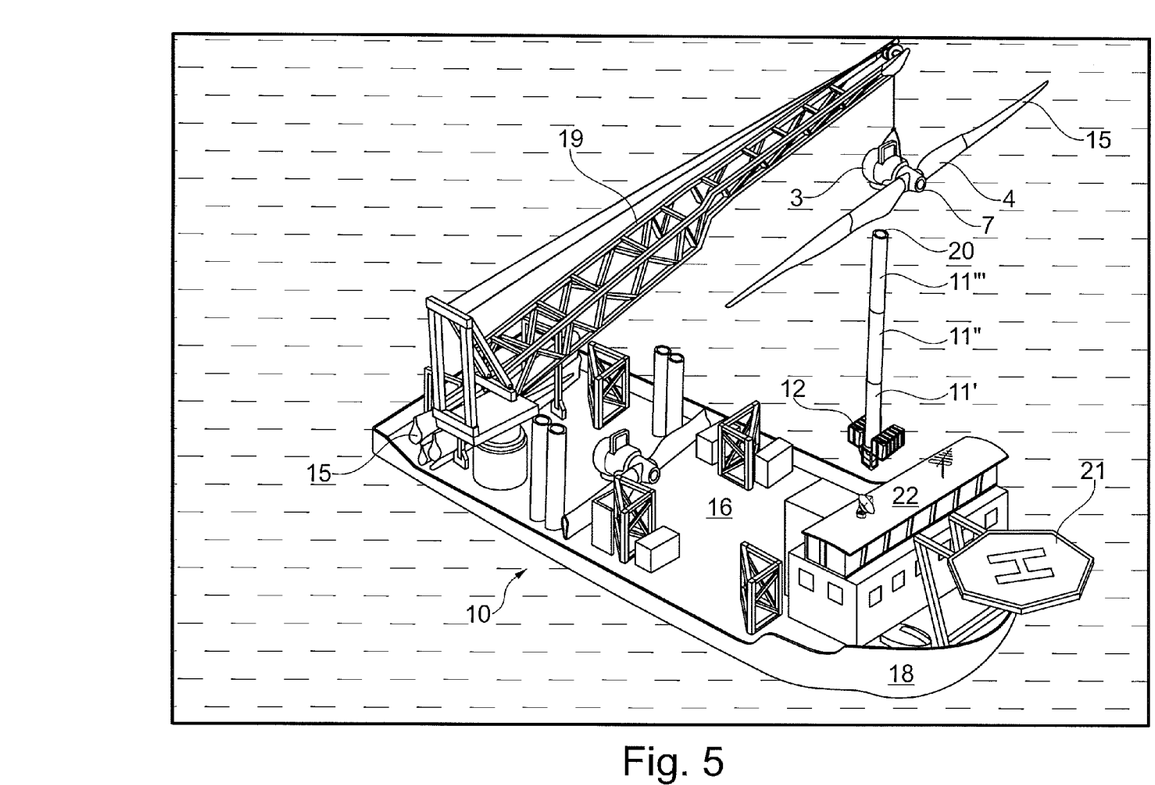
FIG. 5 shows installation of the nacelle and blades at the top of a tower.

FIG. 5 shows a nacelle 3 comprising inner blade parts 4 and outer blade parts 15 being hoisted by the onboard crane 19 to the top of the tower 20. The tower comprises three tower sections 11', 11", 11', where the lower tower section 11' comprises two containers 12, arranged at the framework 13 above sea level. Using a vessel 10 loaded with parts for one, two, three or more wind turbines, it becomes possible to perform a full installation of a complete wind turbine and to move the vessel 10 to the next foundation and perform the next erection. All parts are brought along and the vessel 10 will only have to return for more turbines after having completed the full installation of the load of wind turbines. By bringing all the parts for the wind turbines on one vessel 10, the installation process is optimized and can be done as quickly as possible and within the "time window" with appropriate wind and waves.

Figure 6:
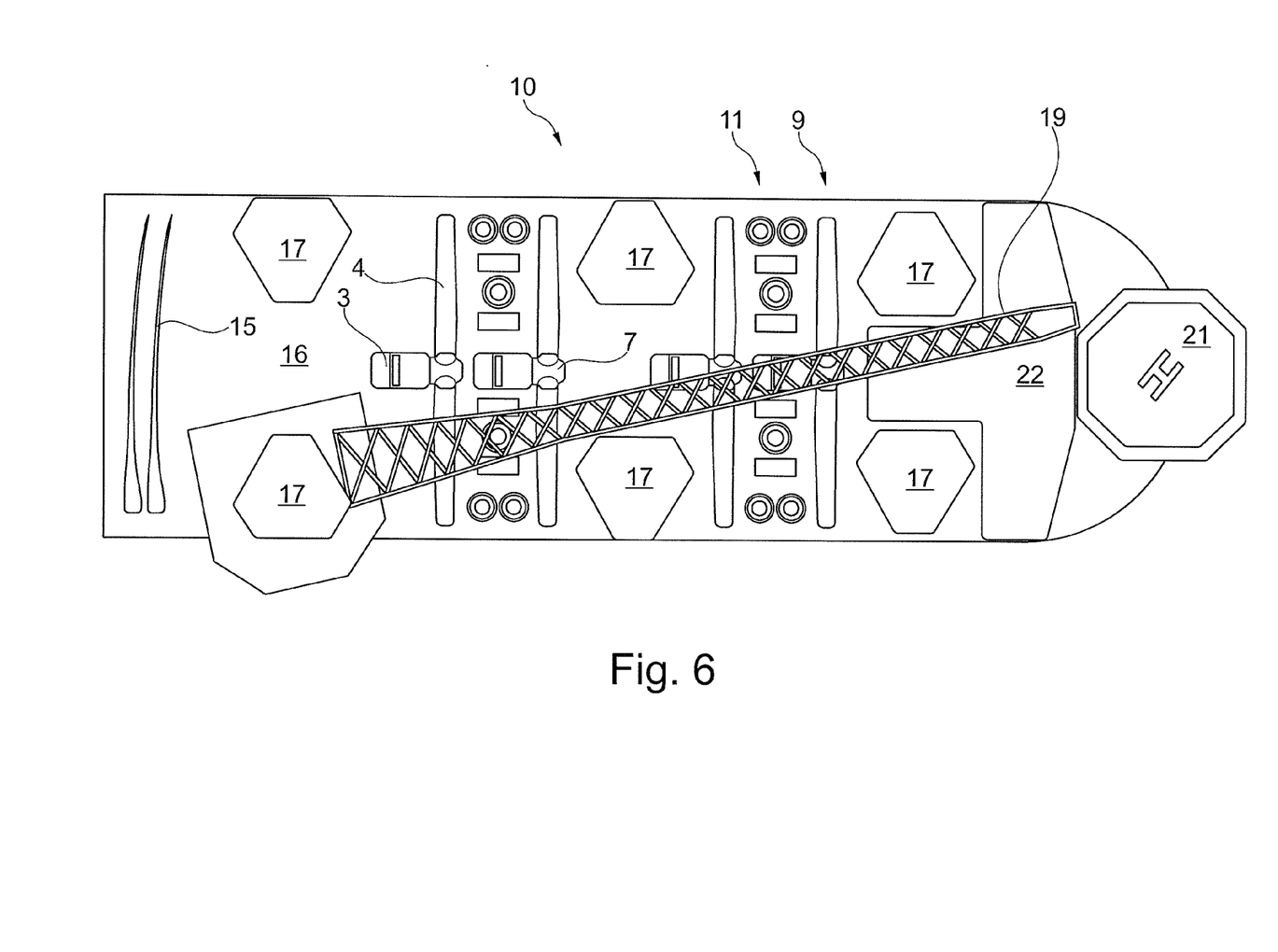
FIG. 6 shows four wind turbines on an installation vessel in a first configuration.

In FIG. 6, a vessel 10 is seen loaded with components for four wind turbines. The vessel 10 comprises six jack-up legs 17 and an onboard crane 19. At the front end of the vessel 10, there is a heliport 21 and it is also here that the bridge 22 of the vessel 10 is arranged. Behind the bridge 22, the deck 16 extends, and the various parts are arranged on the deck. As shown, the nacelle units 9 are arranged with the inner blade parts 4 pointing in the traverse direction of the vessel 10. Two nacelle units 9 and tower sections 11', 11", 11''' for two turbines are situated between the front two sets of jack-up legs 17 and the same situation exists between the back two sets of jack-up legs 17. At the rear end of the deck 16, the outer blade parts 15 for the wind turbines are stacked in four layers. In this configuration, most of the weight from the wind turbine parts is situated along a central portion of the deck 16 and in a symmetrical manner in order to obtain an even distribution of the weight.

Figure 7:
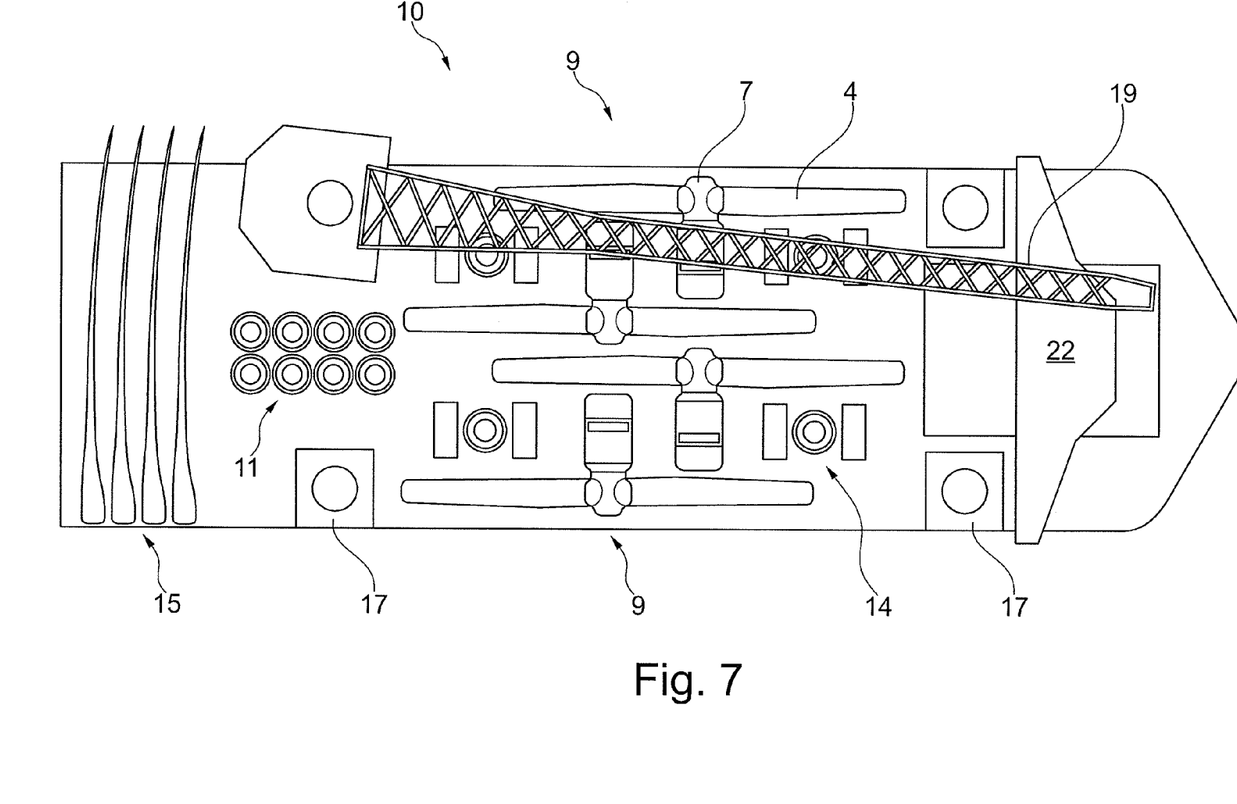
FIG. 7 shows four wind turbines on an installation vessel in a second configuration.

In FIG. 7, a slightly different configuration of the vessel 10 is seen as this vessel 10 only comprises four jack-up legs 17. Here, the four nacelle units 9 present are arranged with the inner blade parts 4 pointing in the lengthwise direction of the vessel 10. The nacelle units 9 are arranged back-to-back pair-wise and with the tower units 14 in-between the inner blade parts 4 and with the tower sections 11", 11' placed behind the nacelle units 9, at the middle of the deck 16. Again, the outer blade parts 15 are situated at the rear end of the deck 16, and here, are arranged in two layers.

Figure 8:
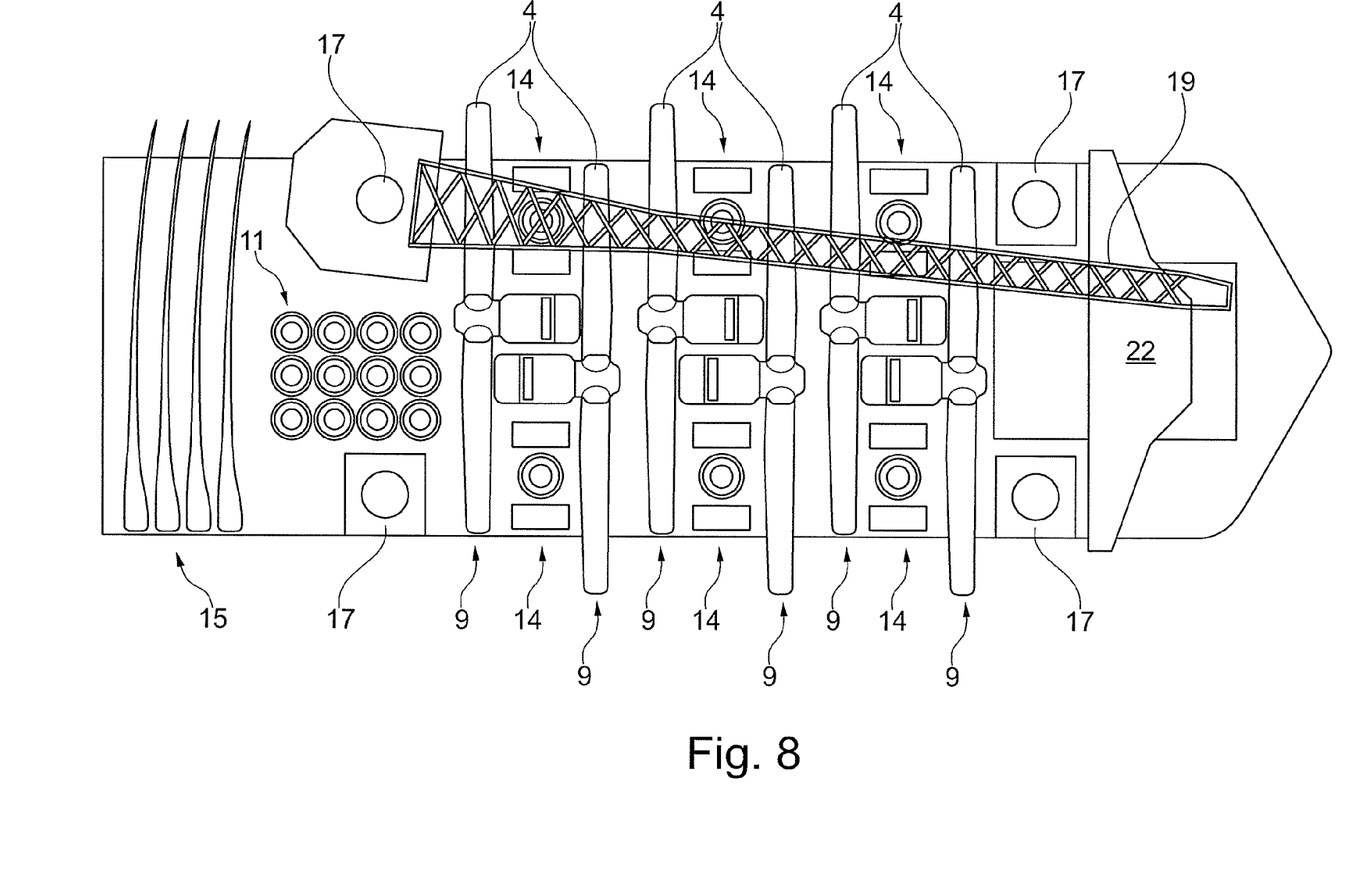
FIG. 8 shows six wind turbines on an installation vessel in a third configuration.

FIG. 8 shows the same vessel 10 as seen in FIG. 7, but here the vessel is loaded in another configuration with parts for six wind turbines. The nacelle units 9 are arranged pair-wise back-to-back and with the tower units 14 located between the inner blade parts 4, but here, the inner blade parts 4 are pointing in the traverse direction of the vessel 10. The outer blade parts 15 are arranged between the back two jack-up legs 17, and the outer blade parts 15 are arranged in three layers at the rear end of the deck 16.

The invention is not limited to the embodiments described herein, and may be modified or adapted without departing from the scope of the present invention as described in the patent claims below.

What is claimed is:

1. Method for assembly and installation of an offshore wind turbine, comprising the steps of:

assembling at least one nacelle having a hub for a two-bladed wind turbine at a harbor area, the hub comprising two blade installation interfaces facing in a radial direction, said two blade installation interfaces having a 180 degree angular distance therebetween, attaching at least one inner blade part to said hub at said harbor area, arranging said at least one nacelle with the attached at least one inner blade part on a deck of a transport and installation vessel, arranging further blade parts of said two-bladed wind turbine on the deck, transporting said at least one nacelle with the attached at least one inner blade part and said further blade parts to said erection site, attaching said further blade parts to said hub, hoisting said at least one nacelle to a position on at least one tower for said two-bladed wind turbine and installing the at least one nacelle at said position.

2. Method for assembling and installation of an offshore wind turbine according to claim 1, wherein said at least one nacelle is assembled at a removable assembly facility located at said harbor area.

3. Method for assembling and installation of an offshore wind turbine according to claim 1, wherein said at least one nacelle is assembled at a removable assembly facility located in proximity to said harbor area.

4. Method for assembling and installation of an offshore wind turbine according to claim 1, wherein at least one of said at least one inner blade part and said further blade parts is manufactured at a removable manufacturing facility located at said harbor area.

5. Method for assembling and installation of an offshore wind turbine according to claim 1, wherein at least one of said at least one inner blade part and said further blade parts is manufactured at a removable manufacturing facility located in proximity to said harbor area.

6. Method for assembling and installation of an offshore wind turbine according to claim 1, wherein at least one of said at least one inner blade part and said further blade parts is assembled at a removable assembly facility located at said harbor area.

7. Method for assembling and installation of an offshore wind turbine according to claim 1, wherein at least one of said at least one inner blade part and said further blade parts is assembled at a removable assembly facility located in proximity to said harbor area.

8. Method for assembling and installation of an offshore wind turbine according to claim 1, wherein, said method further comprises the steps of:
   arranging at least one tower section at the harbor area,
   installing at least one container, at a side of said at least one tower section, said at least one container comprising equipment for controlling the wind turbine and for converting and transforming the power generated by the wind turbine,
   arranging said at least one tower section with the at least one container installed on the deck of said transport and installation vessel.

9. Method for assembling and installation of an offshore wind turbine according to claim 1, wherein, said method further comprises the steps of:
   arranging at least one tower section at the harbor area,
   installing at least one container at a side of said at least one tower section, said at least one container comprising equipment for controlling the wind turbine and for connecting the wind turbine to an electrical grid,
   arranging said at least one tower section, having at least one container installed on the deck of said transport and installation vessel.

10. Method for assembling and installation of an offshore wind turbine according to claim 1, wherein said transport and installation vessel comprises jack-up means for lifting said vessel at least partly out of the sea.

11. Method for assembling and installation of an offshore wind turbine according to claim 1, wherein said transport and installation vessel comprises fixation means for mechanical fixation to a wind turbine foundation or to a transition piece installed at a foundation.

12. Method for assembling and installation of an offshore wind turbine according to claim 1, wherein said at least one nacelle comprises a set of nacelles and wherein the nacelles with installed inner blade parts are arranged on the deck of said transport and installation vessel with the inner blade parts pointed in a transverse direction in relation to a bow to stern direction of the transport and installation vessel.

13. Method for assembling and installation of an offshore wind turbine according to claim 1, wherein said at least one nacelle comprises a set of nacelles and wherein said nacelles with installed inner blade parts are arranged on the deck of said transport and installation vessel with the inner blade parts pointed in a bow to stern direction in relation to the length of the transport and installation vessel.

14. Method for assembling and installation of an offshore wind turbine according to claim 1, wherein said at least one nacelle comprises at least one set of nacelles with at least one inner blade part attached to each nacelle, and wherein said method comprises the further steps of:
   loading at least one set of nacelles on said transport and installation vessel,
   loading at least one set of blades for said two-bladed wind turbine, comprising at least the remaining inner blade part of said at least one set of blades,
   loading tower sections for said at least one tower,
   transporting the loaded at least one set of nacelles, at least one set of blades and tower sections on the same vessel at the same time.

15. Method for assembling and installation of an offshore wind turbine according to claim 14, wherein said
   step of loading at least one set of blades for said two-bladed wind turbine further comprises loading at least one outer blade part.

16. Method for assembling and installation of an offshore wind turbine according to claim 1, wherein said at least one nacelle comprises at least one set of nacelles with at least one inner blade part attached to each nacelle, and wherein said method comprises the further steps of:
   loading at least one set of nacelles on said transport and installation vessel,
   loading at least one set of blades for said two-bladed wind turbine, comprising at least one outer blade part and the remaining inner blade part of said at least one set of blades,
   loading tower sections for said at least one tower,
   transporting the loaded at least one set of nacelles, at least one set of blades and tower sections on the same vessel at the same time.

* * * * *